(12) United States Patent
Maharana et al.

(10) Patent No.: US 12,124,508 B2
(45) Date of Patent: Oct. 22, 2024

(54) MULTIMODAL INTENT DISCOVERY SYSTEM

(71) Applicant: ADOBE INC., San Jose, CA (US)

(72) Inventors: Adyasha Maharana, Cary, NC (US); Quan Hung Tran, San Jose, CA (US); Seunghyun Yoon, San Jose, CA (US); Franck Dernoncourt, San Jose, CA (US); Trung Huu Bui, San Jose, CA (US); Walter W. Chang, San Jose, CA (US)

(73) Assignee: ADOBE INC., San Jose, CA (US)

( * ) Notice: Subject to any disclaimer, the term of this patent is extended or adjusted under 35 U.S.C. 154(b) by 129 days.

(21) Appl. No.: 17/811,963

(22) Filed: Jul. 12, 2022

(65) Prior Publication Data

US 2024/0020337 A1   Jan. 18, 2024

(51) Int. Cl.
*G06F 16/73* (2019.01)
*G06F 16/738* (2019.01)
*G06F 16/783* (2019.01)
*G06F 40/284* (2020.01)
*G10L 13/08* (2013.01)

(52) U.S. Cl.
CPC ........ *G06F 16/739* (2019.01); *G06F 16/7844* (2019.01); *G06F 40/284* (2020.01); *G10L 13/08* (2013.01)

(58) Field of Classification Search
CPC .............. G06F 16/739; G06F 16/7844; G06F 40/284; G10L 13/08
See application file for complete search history.

(56) References Cited

U.S. PATENT DOCUMENTS

| | | | | |
|---|---|---|---|---|
| 2008/0266382 | A1* | 10/2008 | Smith | G11B 27/322 348/E7.083 |
| 2014/0075014 | A1* | 3/2014 | Chourey | G06Q 30/02 709/224 |
| 2020/0257712 | A1* | 8/2020 | Singh | G06F 16/3344 |
| 2020/0320116 | A1* | 10/2020 | Wu | H04L 51/10 |
| 2023/0153352 | A1* | 5/2023 | Mondal | G06V 10/764 707/736 |

OTHER PUBLICATIONS

1Vedula, et al., "Towards Open Intent Discovery for Conversational Text", arXiv preprint: arXiv:1904.08524v1 [cs.IR] Apr. 17, 2019, 11 pages.
2Yu, et al., "Improving Multimodal Named Entity Recognition via Entity Span Detection with Unified Multimodal Transformer", Proceedings of the 58th Annual Meeting of the Association for Computational Linguistics, pp. 3342-3352, Jul. 5-10, 2020.

* cited by examiner

*Primary Examiner* — Girumsew Wendmagegn
(74) *Attorney, Agent, or Firm* — F. CHAU & ASSOCIATES, LLC

(57) ABSTRACT

Systems and methods for intent discovery and video summarization are described. Embodiments of the present disclosure receive a video and a transcript of the video, encode the video to obtain a sequence of video encodings, encode the transcript to obtain a sequence of text encodings, apply a visual gate to the sequence of text encodings based on the sequence of video encodings to obtain gated text encodings, and generate an intent label for the transcript based on the gated text encodings.

20 Claims, 10 Drawing Sheets

1:34:28 → 1:34:33

1:48:14 → 1:48:21

Select the inverse and give a little bit of detail right to that edge.

600

I am going to make a new layer and use a clipping mask again on the flower. I might use a textured brush.

605

3:40:48 → 3:50:51

4:47:40 → 4:47:48

So I am blurring some of my groups.

605

I'm happy with that, so I merge it down and then we'll make a new layer and let's add some more plants and stuff.

605    600

MULTIMODAL INTENT DISCOVERY SYSTEM

BACKGROUND

The following relates to video intent discovery. Intent discovery is a natural language processing task that identifies the intent behind a portion of text. Video intent discovery is a related task that identifies intents of a speaker in a video. For example, instructional videos convey both abstract and specific intent for tasks such as cooking, where e.g., an abstract culinary intent could be "let's bring out the flavor" and a detailed intent could be "add a pinch of nutmeg". Instructional videos are created every day as users generate diverse "how-to", DIY, and tutorial videos.

Some conventional systems utilize extractive techniques to identify intents from the spoken language in the video. For example, some systems predict speaker intents by analyzing the transcript of a sentence in the video and its surrounding context. However, in longer videos such as livestream tutorials, off-topic conversations and other noise can result in inaccurate predictions of intent. Intents can be identified manually by a human, but this is an expensive and time consuming process. Being able to understand the videos on the basis of identifying such intents enables downstream applications such as video summarization, search, and recommendations. Therefore, there is a need in the art for systems and methods to automatically and accurately identify intents within videos.

SUMMARY

The present disclosure describes systems and methods for multimodal intent discovery. Embodiments of the present disclosure include an intent discovery apparatus configured to identify intents from a video and a transcript of the video. The intent discovery apparatus includes a gating component configured to identify relevant features (e.g., embeddings) from the transcript based on the context of the video signal. Some embodiments include a text encoder and a visual encoder to generate text features and visual features, respectively. Some embodiments further include cascaded cross-attention component which assists in regulating the contribution of both the language modality and the visual modality in the final prediction of the intents.

A method, apparatus, non-transitory computer readable medium, and system for multimodal intent discovery are described. One or more aspects of the method, apparatus, non-transitory computer readable medium, and system include receiving a video and a transcript of the video; encoding the video to obtain a sequence of video encodings; encoding the transcript to obtain a sequence of text encodings; applying a visual gate to the sequence of text encodings based on the sequence of video encodings to obtain gated text encodings; and generating an intent label for the transcript based on the gated text encodings.

A method, apparatus, non-transitory computer readable medium, and system for multimodal intent discovery are described. One or more aspects of the method, apparatus, non-transitory computer readable medium, and system include receiving training data including a video, a transcript of the video, and a ground-truth intent label; encoding the video to obtain a sequence of video encodings; encoding the transcript to obtain a sequence of text encodings; applying a visual gate of a machine learning model to the sequence of text encodings based on the sequence of video encodings to obtain gated text encodings; predicting an intent label for the transcript based on the gated text encodings using the machine learning model; and updating parameters of the machine learning model based on the predicted intent label and the ground-truth intent label.

An apparatus, system, and method for multimodal intent discovery are described. One or more aspects of the apparatus, system, and method include an image encoder configured to encode a video to obtain a sequence of video encodings; a text encoder configured to encode a transcript of the video to obtain a sequence of text encodings; a gating component configured to apply a visual gate to the sequence of text encodings based on the sequence of video encodings to obtain gated text encodings; and a classifier configured to generate an intent label for the transcript based on the gated text encodings.

DETAILED DESCRIPTION

Figure 1:
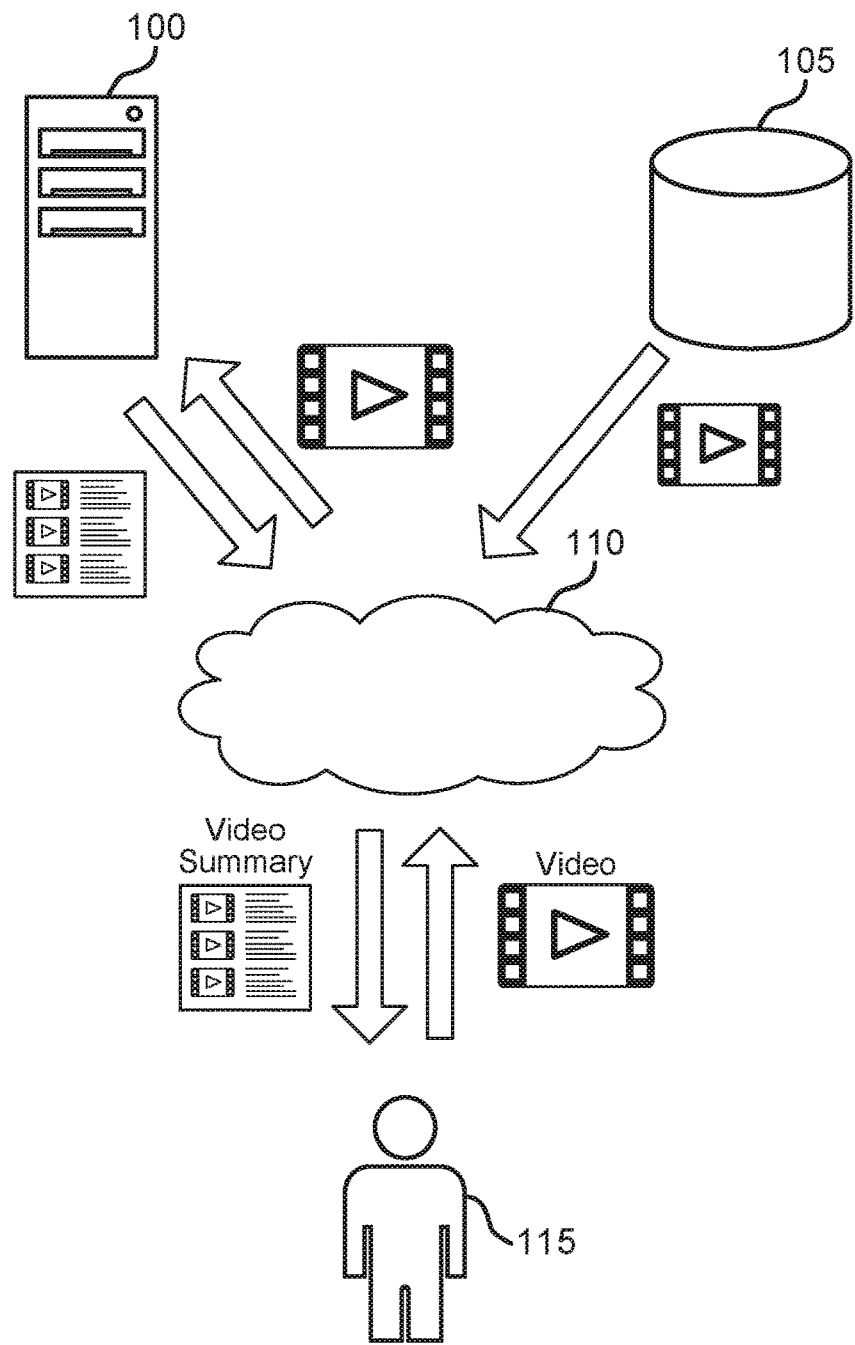
FIG. 1 shows an example of an intent discovery system according to aspects of the present disclosure.

The present disclosure describes systems and methods for multimodal intent discovery and video summarization. Intent discovery is one of many tasks in video understanding. While significant progress has been made in basic video understanding tasks, identifying procedural intent within longer videos remains relatively unexplored, and is essential to video summarization, search, and recommendation. Multimodal intent discovery involves identifying intents from a speaker in a video using multiple modalities, such as text from a transcript of the video as well as the video itself. By discovering these intents, important tasks such as semantic indexing of videos, knowledge graph creation for video search and recommendations, intent highlighting, and video summarization can be improved.

Some comparative intent discovery methods are based on the analysis and processing of language features, such as transcript data or audio data. For example, some methods are designed around the task of slot filling dialogue data. These models classify words in a sentence according to their predicted purpose in a query. This is sufficient for some well-constrained contexts, such as analyzing a user's query to a computer, or the determining the tone of an email. However, they can be less effective when applied to intent discovery for videos, and especially for longer videos.

Longer videos often contain language information that is extraneous to the intents of the speakers within it. Such extraneous information should be filtered out for accurate intent discovery.

Further, intents can have varying levels of abstractness and detail. In a tutorial video, an instructor might not use a formal lexicon or explicitly describe all steps. In some cases, the abstract intents do not follow the typical slot model and can be more difficult to identify. One domain that contains examples of both abstract and detailed intent types is software training videos for creative tasks such as making photo or video effects. While there are video and phrase datasets which cover a wide variety of tutorials for visual tasks demonstrated by humans, such as painting and DIY projects, software-based instructional videos are not yet available in such sets. Embodiments of the present disclosure are able to determine abstract and detailed intent types from software-instructional videos containing instructional intents, which will assist in generating new labeled data in this domain.

A livestream tutorial might demonstrate topics such as photo retouching, image editing, creating posters, painting, and adding photo effects. The livestream may convey creative and tool intents, and can include actual tools used during a session (e.g., a pen tool, an eraser tool, or the like). Analyzing language features alone might not provide complete information about the instructional intent and about the tools and commands used. False positive intents may arise from parenthetical comments from the instructor, or from other off topic conversation. In one example, the phrase "flipping the canvas" in "Are you flipping the canvas?" may indicate a tool intent. However, a later review of the video clip may reveal that it is in fact part of a livestream chit-chat and does not take place on-screen.

Embodiments of the present disclosure apply information from the visual data as well as the transcript. Incorporating both language and video modalities can enhance intent extraction of such ambiguous intents. Embodiments utilize both these modalities, and are able to discover both creative and tool intents while using joint language and video knowledge to detect false positive intents.

For example, some embodiments encode text features from a video's transcript, as well as visual features from the video content. The visual features can be encoded representations of each frame of the video, spatial features, motion features that encompass temporal information, or of any combination thereof. The visual features are input into a gating component that removes false positive intents extracted from the text features. Some embodiments further include a cascaded cross-attention component with several cross-attention layers to efficiently combine the video signal with the text signal as a part of the gating component. Then, the output of the gating component is applied to a classifier layer to generate the intents.

Details regarding the architecture of an example intent discovery system and apparatus are provided with reference to FIGS. 1-4. Example processes for intent discovery and downstream applications of intent discovery, such as video search and video summarization, are provided with reference to FIGS. 5-9. An example training process is provided with reference to FIG. 10.

Intent Discovery System

A system and apparatus for multimodal intent discovery are described. One or more aspects of the apparatus include an image encoder configured to encode a video to obtain a sequence of video encodings; a text encoder configured to encode a transcript of the video to obtain a sequence of text encodings; a gating component configured to apply a visual gate to the sequence of text encodings based on the sequence of video encodings to obtain gated text encodings; and a classifier configured to generate an intent label for the transcript based on the gated text encodings.

In some aspects, the gating component comprises a temporal transformer. In some aspects, the gating component comprises a text self-attention component, a video self-attention component, and a cascaded cross-attention component. In at least one embodiment, the cascaded cross-attention component comprises a video-to-text cross-attention component, a text-to-text cross-attention component, and a text-to-video cross-attention component.

FIG. 1 shows an example of an intent discovery system according to aspects of the present disclosure. The example shown includes intent discovery apparatus 100, database 105, network 110, and user 115.

In one example, user 115 provides a video including a summary to intent discovery apparatus 100. In this example, user 115 provides the video through network 110. Optionally, user 115 may provide the video through a user interface of his or her local device. Then, intent discovery apparatus 100 generates intents from the video. These intents may be associated with sentences that are timestamped in the transcript. In some cases, user 115 selects a video from database 105, and database 105 provides the video to intent discovery apparatus 100.

The intent discovery apparatus 100 can be implemented within a local machine, or may be implemented on a networked server. A server provides one or more functions to users 115 linked by way of one or more of the various networks 110. In some cases, the server includes a single microprocessor board, which includes a microprocessor responsible for controlling all aspects of the server. In some cases, a server uses microprocessor and protocols to exchange data with other devices/users 115 on one or more of the networks 110 via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a super computer, or any other suitable processing apparatus.

Network 110 may be referred to as a cloud. A cloud is a computer network configured to provide on-demand availability of computer system resources, such as data storage and computing power. In some examples, the cloud provides resources without active management by the user 115. The term cloud is sometimes used to describe data centers available to many users 115 over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

A database 105 is an organized collection of data. For example, a database 105 stores data in a specified format known as a schema. A database 105 may be structured as a single database, a distributed database, multiple distributed databases, or an emergency backup database. In some cases, a database controller may manage data storage and processing in a database 105. In some cases, a user 115 interacts with database controller. In other cases, database controller may operate automatically without a user interaction.

A user interface may enable a user to interact with a device. In some embodiments, the user interface may include an audio device, such as an external speaker system, an external display device such as a display screen, or an input device (e.g., remote control device interfaced with the user interface directly or through an IO controller module). In some cases, a user interface may be a graphical user interface (GUI).

According to some aspects, intent discovery apparatus 100 receives a video and a transcript of the video. Some examples of intent discovery apparatus 100 identify intents by generating intent labels for portions of the transcript. Source videos can include several different potential intents. Accordingly, embodiments extract intents by detecting spans within the language content of the video (i.e., associated transcript). In some examples, intent discovery apparatus 100 generates a span annotation for each word of the transcript, where the intent labels include the span annotations. In some examples, intent discovery apparatus 100 identifies a first span of the transcript corresponding to a high-level intent category. In some examples, intent discovery apparatus 100 identifies a second span of the transcript corresponding to a low-level intent category. In some aspects, the high-level intent category corresponds to a creative intent, the low-level intent category corresponds to a tool intent, and the video includes a tutorial for a media editing application. Intent discovery apparatus 100 is an example of, or includes aspects of, the corresponding element described with reference to FIG. 2.

Figure 2:
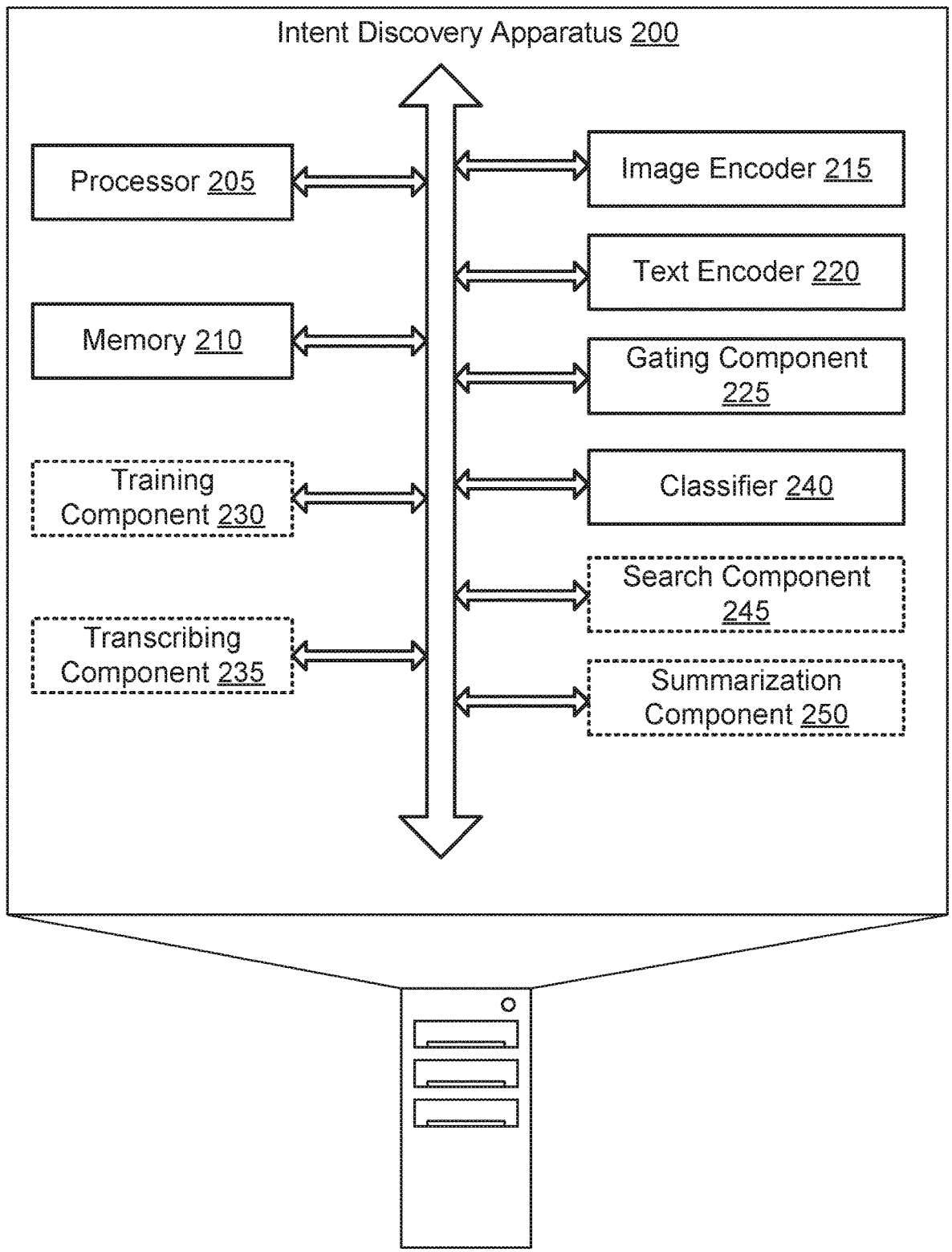
FIG. 2 shows an example of an intent discovery apparatus according to aspects of the present disclosure.

FIG. 2 shows an example of an intent discovery apparatus 200 according to aspects of the present disclosure. The example shown includes intent discovery apparatus 200, processor 205, memory 210, image encoder 215, text encoder 220, gating component 225, training component 230, transcribing component 235, classifier 240, search component 245, and summarization component 250. Intent discovery apparatus 200 is an example of, or includes aspects of, the corresponding element described with reference to FIG. 1.

Processor 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor 205 is configured to operate memory 210 array using a memory controller. In other cases, a memory controller is integrated into processor 205. In some cases, processor 205 is configured to execute computer-readable instructions stored in memory 210 to perform various functions. In some embodiments, processor 205 includes special purpose components for modem processing, baseband processing, digital signal processing, or transmission processing.

In some embodiments, image encoder 215 and text encoder 220 are implemented by one or more artificial neural networks. A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

In at least one embodiment, text encoder 220 extracts text features using a transformer network. A transformer or transformer network is a type of neural network models used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (e.g., target sentences) are first embedded into an n-dimensional space. Positional encoding of the different words (i.e., give every word/part in a sequence a relative position since the sequence depends on the order of its elements) are added to the embedded representation (n-dimensional vector) of each word.

In at least one embodiment, text encoder 220 includes a machine learning model with a bi-directional encoder representations from transformers (BERT) architecture. BERT is a transformer-based model that is used for natural language processing and for processing other forms of ordered data. In some examples, BERT is used as a language representation model, and is configured to pretrain deep bidirectional representations from unlabeled text by jointly conditioning on both left and right context in all layers. As a result, the pre-trained BERT model can be fine-tuned with an additional output layer to create network models for tasks such as question answering and language inference.

According to some aspects, text encoder 220 encodes the transcript to obtain a sequence of text encodings. In some examples, text encoder 220 divides the transcript into a set of sentences. In some examples, text encoder 220 divides each of the set of sentences into a sequence of tokens. In some examples, text encoder 220 encodes each token in the sequence of tokens to obtain the sequence of text encodings. Text encoder 220 is an example of, or includes aspects of, the corresponding element described with reference to FIGS. 3 and 4.

According to some aspects, image encoder 215 encodes the video to obtain a sequence of video encodings. In some examples, image encoder 215 selects a set of frames of the video, and encodes each of the set of frames using an image encoder 215 to obtain the sequence of video encodings corresponding to video features. In at least one embodiment, the video features include spatial features. In one embodiment, the video features include motion features that encompass temporal information.

In at least one embodiment, image encoder 215 includes a convolutional neural network (CNN). A CNN is a class of neural network that is commonly used in computer vision or image classification systems. In some cases, a CNN may enable processing of digital images with minimal preprocessing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input. Image encoder 215 is an example of, or includes aspects of, the corresponding element described with reference to FIGS. 3 and 4.

According to some aspects, gating component 225 applies a visual gate to the sequence of text encodings based on the sequence of video encodings to obtain gated text encodings. In some examples, gating component 225 combines the sequence of video encodings with the sequence of text encodings to obtain a sequence of combined encodings. In some examples, gating component 225 applies a temporal transformer to the sequence of combined encodings to obtain the visual gate.

In some examples, gating component 225 applies a self-attention component to the sequence of text encodings to obtain a sequence of weighted text encodings, where the visual gate is applied to the sequence of weighted text encodings. In some examples, gating component 225 applies a second self-attention component to the sequence of video encodings to obtain a sequence of weighted video encodings. In at least one embodiment, gating component 225 applies a cascaded cross-attention component to the sequence of weighted text encodings and the sequence of weighted video encodings to obtain the visual gate.

In an embodiment, gating component 225 includes a video-to-text cross-attention component, a text-to-text cross-attention component, and a text-to-video cross-attention component. This is described in further detail with reference to FIG. 4. In an example, gating component 225 applies the video-to-text cross-attention component to the sequence of weighted text encodings and the sequence of weighted video encodings to obtain a video-to-text cross-attention output. Additionally or alternatively, gating component 225 then applies a text-to-text cross-attention component to the sequence of weighted text encodings and the video-to-text cross-attention output to obtain a text-to-text cross-attention output. Additionally or alternatively, gating component 225 applies a text-to-video cross-attention component to the sequence of weighted text encodings and the sequence of weighted video encodings to obtain a text-to-video cross-attention output, where the visual gate is based on the text-to-text cross-attention output and the text-to-video cross-attention output. Gating component 225 is an example of, or includes aspects of, the corresponding element described with reference to FIG. 3.

Training component 230 is configured to adjust parameters of a machine learning model. For example, training component 230 may adjust parameters within text encoder 220, image encoder 215, and gating component 225. According to some aspects, training component 230 receives training data including a video, a transcript of the video, and a ground-truth intent label. In some examples, training component 230 updates parameters of the machine learning model based on the predicted intent label and the ground-truth intent label. In some examples, training component 230 computes a cross-entropy loss based on the predicted intent label and the ground-truth intent label, where the parameters of the machine learning model are updated based on the cross-entropy loss. In at least one embodiment, training component 230 is implemented in a different apparatus other than intent discovery apparatus 200.

According to some aspects, transcribing component 235 identifies audio data associated with the video. In some examples, transcribing component 235 performs a text-to-speech conversion on the audio data to obtain the transcript. In at least one embodiment, transcribing component 235 is implemented in a different apparatus other than intent discovery apparatus 200.

According to some aspects, classifier 240 predicts an intent label for the transcript based on the gated text encodings using the machine learning model. According to some aspects, classifier 240 generates an intent label for the transcript based on gated text encodings output from gating component 225. Some embodiments of classifier 240 comprises a machine learning model such as an artificial neural network (ANN). In at least one embodiment, classifier 240 includes a recurrent neural network. Classifier 240 is an example of, or includes aspects of, the corresponding element described with reference to FIGS. 3 and 4.

According to some aspects, search component 245 receives a search query indicating an intent. In some examples, search component 245 compares the search query to the intent label. In some examples, search component 245 retrieves the video based on the comparison. In at least one embodiment, search component 245 is implemented in a different apparatus other than intent discovery apparatus 200.

According to some aspects, summarization component 250 generates a summary of the video based on the intent label. In an example, summarization component 250 combines intent labels with timestamps and representative frames from the video to generate a summary. In at least one embodiment, summarization component 250 is implemented in a different apparatus other than intent discovery apparatus 200.

Figure 3:
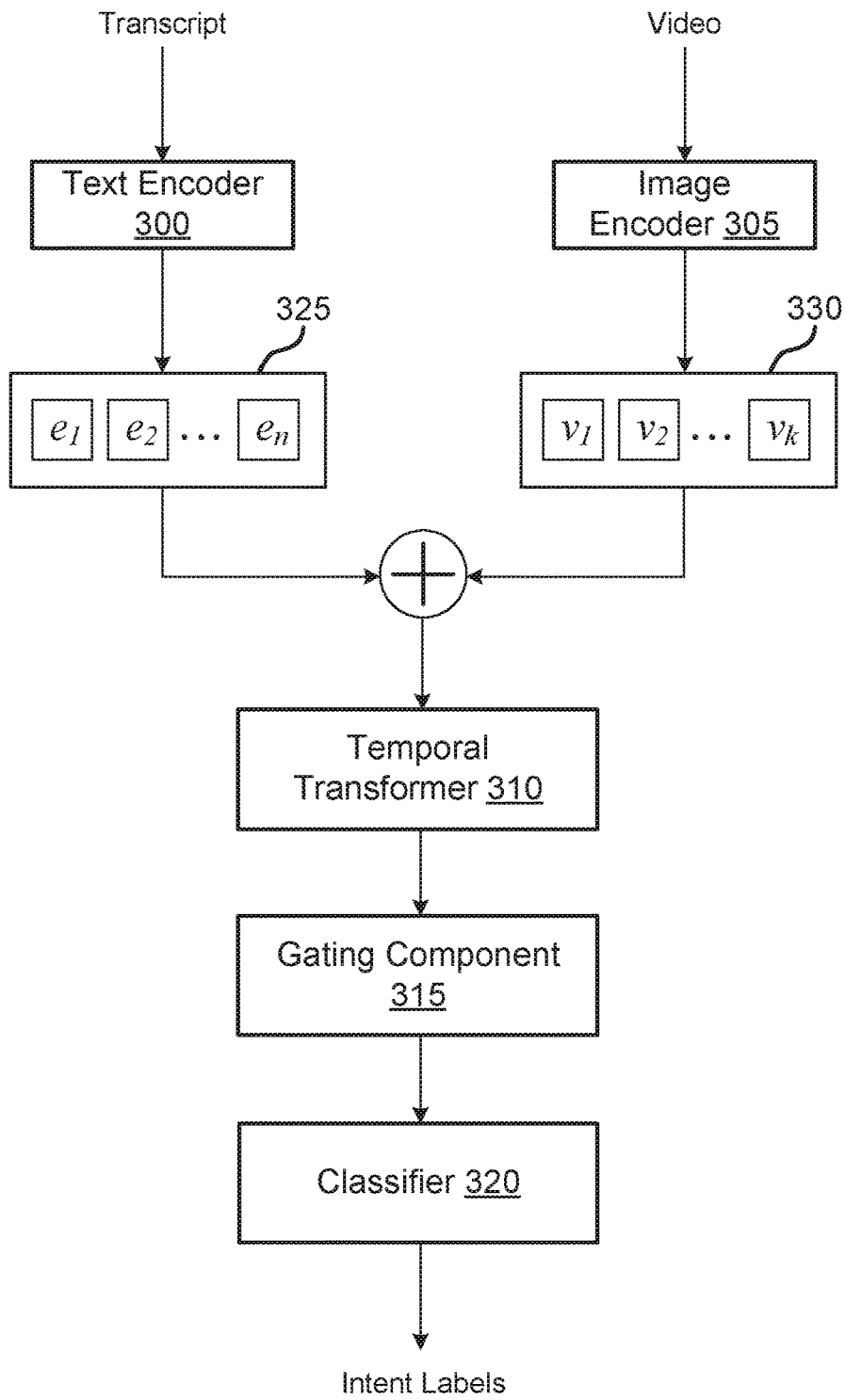
FIG. 3 shows an example of an intent discovery diagram according to aspects of the present disclosure.

FIG. 3 shows an example of an intent discovery diagram according to aspects of the present disclosure. The example shown includes text encoder 300, image encoder 305, temporal transformer 310, gating component 315, classifier 320, text features 325, and visual features 330.

Text encoder 300 is an example of, or includes aspects of, the corresponding element described with reference to FIGS. 2 and 4. Image encoder 305 is an example of, or includes aspects of, the corresponding element described with reference to FIGS. 2 and 4. Temporal transformer 310 is a type of artificial neural network that can process series data and may include self-attention components. Gating component 315 is an example of, or includes aspects of, the corresponding element described with reference to FIG. 2. Classifier 320 is an example of, or includes aspects of, the corresponding element described with reference to FIGS. 2 and 4.

Text features 325 are an example of, or include aspects of, the corresponding element(s) described with reference to FIG. 4. Text encoder 300 encodes information from the transcript to produce text features 325. In one embodiment, each text feature 325 is a representation of a sentence from the transcript. In one embodiment, each text feature 325 is a representation of a word from the transcript. Text features 325 may each include contextual information about previous sentences or words, as well as future sentences or words.

Visual features 330 are an example of, or include aspects of, the corresponding element(s) described with reference to FIG. 4. Image encoder 305 encodes information from the video to produce video features 330. Video features 330 can include frame representations from the video, as well as spatial representations or representations of motion features that include temporal information.

Figure 4:
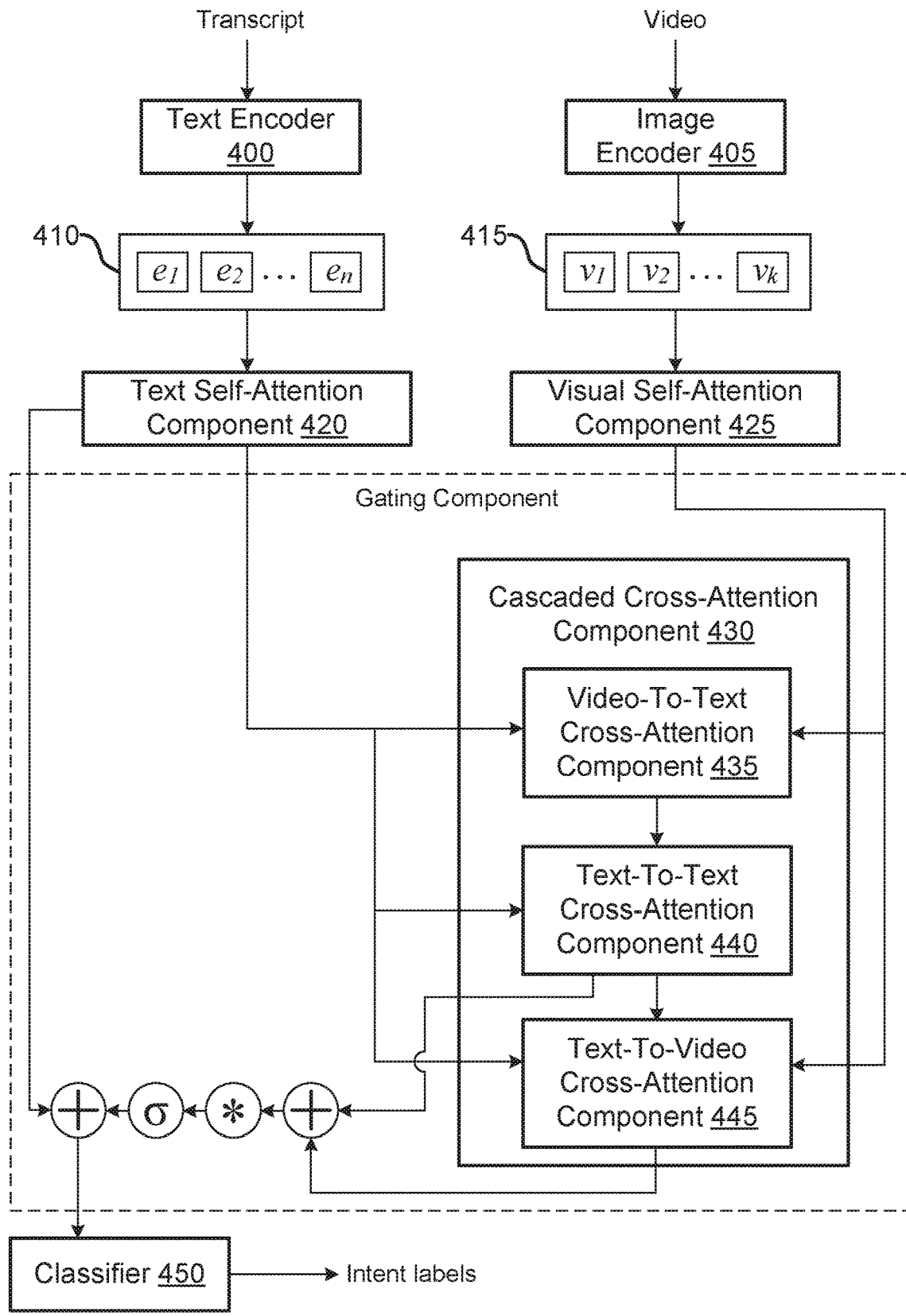
FIG. 4 shows an example of a visual gate diagram according to aspects of the present disclosure.

FIG. 4 shows an example of a visual gate diagram according to aspects of the present disclosure. FIG. 4 shows an intent discovery pipeline that is similar to the example shown in FIG. 3, but includes additional detail about example constituent components and information flow within the gating component (e.g., gating component 315 of FIG. 3). The example shown includes text encoder 400, image encoder 405, text features 410, visual features 415, text self-attention component 420, visual self-attention component 425, cascaded cross-attention component 430, and classifier 450. The cascaded cross-attention component 430 may further include a video-to-text cross-attention component 435, text-to-text cross-attention component 440, and text-to-video cross-attention component 445.

Text encoder 400 is an example of, or includes aspects of, the corresponding element described with reference to FIGS. 2 and 3. Image encoder 405 is an example of, or includes aspects of, the corresponding element described with reference to FIGS. 2 and 3.

As described with reference to the corresponding element in FIG. 2, some examples of text encoder 400 include a transformer network. In some examples, a transformer network includes an attention mechanism, where the attention looks at an input sequence and decides at each step which other parts of the sequence are important. In some examples, the attention mechanism involves query, keys, and values denoted by Q, K, and V, respectively. Q is a matrix that contains the query (i.e., vector representation of one word in the sequence), K are all the keys (i.e., vector representations of all the words in the sequence), and V are the values, which are the vector representations of all the words in the sequence. For the encoder and decoder, multi-head attention modules, V consists of the same word sequence as Q. However, for the attention module that is taking into account the encoder and the decoder sequences, V is different from the sequence represented by Q. In some cases, values in V are multiplied and summed with some attention-weights, a.

In generating text features 410, an input sentence from language in the video may be denoted by $X=[x_0, \ldots, x_N]$ where N is the length of the sentence. In one example, intent phrases from the dataset generation are tagged with IOB (i.e., inside, outside, beginning) span annotations for two classes of intents: tool and creative intents. The IOB tags across the length of the sentence and can be denoted by $Z=[z_0, \ldots, z_N]$. Embodiments use text encoder $f_{enc}$ (e.g., text encoder 400) to extract text encodings E, i.e. $E=f_{enc}(x)$ The encodings are passed to a classifier layer (e.g., classifier 450) for computing tag probabilities. The tag probabilities can be denoted by $\hat{Z}$, where $\hat{Z}=\text{softmax}(W_c*E+b_c)$, and where $W_c$ and $b_c$ are parameters of the classifier layer. Classifier 450 is an example of, or includes aspects of, the corresponding element described with reference to FIGS. 2 and 3.

Text features 410 are an example of, or include aspects of, the corresponding element(s) described with reference to FIG. 3. Visual features 415 are an example of, or include aspects of, the corresponding element(s) described with reference to FIG. 3.

One approach to incorporate information from the video signal is referred to as basic fusion. Basic fusion uses feature fusion between the text signal and the video signal. In this basic joint video-text model, a cross-attention layer is added on top of the pretrained text encoder and the output of the cross-attention layer is used for sequence label classification. With visual features denoted as V, the basic model can be described as follows:

$$\hat{Z}=\text{softmax}(W_c*f_{self}(f_{cross}(E,V))+b_c) \quad (1)$$

where E, $f_{self}$, and $f_{cross}$ are text encodings (e.g. text features 410), self-attention, and cross-attention layers, respectively.

However, while basic fusion combines features from the video and text, in some cases it does not improve over text-only models. Analysis of the basic fusion model indicates that the textual features dominate the final decision, especially in abstract intent classes; for example, creative intent classes. Experimental data suggests that human operators are inefficient at determining intent classification without textual information. However, the same experiments suggest that the video signal is useful for determining whether an intent is present or not. For example, in some livestream videos, many of the intent candidates identified by text models are obtained from chitchat utterances from the instructor, and are false positives. Accordingly, some embodiments utilize a cascaded model with deeper interaction between video and text signal.

Some embodiments of the multimodal cascaded cross-attention model adhere to the following process: First, the set of contextualized embeddings E (e.g., text features 410) are extracted from the text encoder $f_{self}$ (e.g., text encoder 400) and transformed through two self-attention layers (e.g. text self-attention component 420) to create a two-stream architecture. In the first stream, the text encodings (e.g., contextualized embeddings E) are processed through a single-layer of self-attention to produce $E_1$. Similarly, in the second stream, the text-encodings (e.g., contextualized embeddings E) are first transformed through self-attention to produce $E_2$ and are then combined with video embeddings through cascaded cross-attention component 430. $V=[v_0, v_1, \ldots, x_k]$ is the sequence of video embeddings (e.g., video features 415) for the input video clip. An example cascaded cross-attention component 430 contains three cross-attention layers: video-to-text $f_{v2t}(\bullet)$, text-to-video text $f_{t2v}(\bullet)$, and text-to-text cross-attention text $f_{t2t}(\bullet)$. For example, in one aspect, cascaded cross-attention component 430 includes video-to-text cross-attention component 435, text-to-text cross-attention component 440, and text-to-video cross-attention component 445. The output from cascaded cross-attention component 430 is then computed as follows:

$$S_1=f_{v2t}(W_m V+b_m, E_2)$$

$$S_2=f_{t2t}(E_2, S_1)$$

$$S_3=f_{t2v}(E_{s2}, W_m V+b_m) \quad (2)$$

where $W_m$, $b_m$ are the parameters of a linear layer for transforming video embeddings. Next, the outputs from cross-attention layers are concatenated, linearly mapped, and transformed into 0-1 values using a non-linear function (e.g., a sigmoid) to generate a "visual gate". This is illustrated in FIG. 4 with the +, *, and σ operators, respectively. Finally, the output from the cross-attention layer is multiplied with this gate, i.e.

$$S_{gate}=\text{sigmoid}(W_g[S_2;S_3]+b_g)$$

$$S_{clf}=[S_{gate}*S_3;E_{s1}] \quad (3)$$

The visual gate is dynamically computed using the contextualized video representations, and is used in some embodiments to trim the video signal to relevant portions. This can help in regulating the contribution of the two modalities for the final prediction. The concatenation represents the late-fusion of text-only embeddings and the video-contextualized text embeddings. This merged representation is then sent to the classifier layer (e.g., classifier 450) for classification, i.e. intent tag probabilities $\hat{Z}=\text{softmax}(W_c*S_{clf}+b_c)$.

Some embodiments of the multimodal model are based on a hierarchical encoding model which encodes both local contexts of a video frame with the global context of the video. This hierarchical encoding model is known as a Hero model. These techniques can accommodate the modelling of long video clips and all phrases associated with the clip, as well as the query for a given task (e.g., a sentence). For example, given a sequence of video clips and corresponding phrases, $V_{cross}$ represents the cross-contextualized frame embeddings from a Cross-modal Transformer module. $V_{cross}$ is then concatenated with query embeddings before being sent to a Temporal Transformer module $f_{temp}$ for global contextualization. The embeddings for a query phrase are denoted as $W_{emb}^q$. Accordingly, the output from $f_{temp}$ is as follows:

$$S_{temp} = f_{temp}([V_{cross}; W_{emb}^q])$$

$$S_{out} = S_{temp}[N_v:(N_v+N_t),:] \quad (4)$$

where $N_v$ is the number of frames in $V_{cross}$ and $N_t$ is the number of tokens in the query. The output of $f_{temp}$ can be masked to select the representations pertaining to the query. In some models implementing the basic fusion setting, $S_{out}$ is sent to the classifier layer (e.g., is not passed through the visual gate).

Some embodiments of the multimodal model integrate the late fusion into the base hierarchical model, where the visual gate is computed as in Equations (2) and (3) and $S_{clf}$ is sent to the classifier layer (e.g., classifier 450) to generate intent labels. Unlike basic fusion, late fusion allows controlled integration of the video signal with the query encodings. A late fusion example is illustrated in FIG. 4.

Intent Discovery and Video Summarization

A method for multimodal intent discovery is described. One or more aspects of the method include receiving a video and a transcript of the video; encoding the video to obtain a sequence of video encodings; encoding the transcript to obtain a sequence of text encodings; applying a visual gate to the sequence of text encodings based on the sequence of video encodings to obtain gated text encodings; and generating an intent label for the transcript based on the gated text encodings.

Some examples of the method, apparatus, non-transitory computer readable medium, and system further include selecting a plurality of frames of the video. Some examples further include encoding each of the plurality of frames using an image encoder to obtain the sequence of video encodings. Some examples of the method, apparatus, non-transitory computer readable medium, and system generate further video encodings based on spatial features, and based on motion features that encompass temporal information.

Some examples of the method, apparatus, non-transitory computer readable medium, and system further include identifying audio data associated with the video. Some examples further include performing a text-to-speech conversion on the audio data to obtain the transcript.

Some examples of the method, apparatus, non-transitory computer readable medium, and system further include dividing the transcript into a plurality of sentences. Some examples further include dividing each of the plurality of sentences into a sequence of tokens. Some examples further include encoding each token in the sequence of tokens to obtain the sequence of text encodings.

Some examples of the method, apparatus, non-transitory computer readable medium, and system further include combining the sequence of video encodings with the sequence of text encodings to obtain a sequence of combined encodings. Some examples further include applying a temporal transformer to the sequence of combined encodings to obtain the visual gate.

Some examples of the method, apparatus, non-transitory computer readable medium, and system further include applying a self-attention component to the sequence of text encodings to obtain a sequence of weighted text encodings, wherein the visual gate is applied to the sequence of weighted text encodings.

Some examples of the method, apparatus, non-transitory computer readable medium, and system further include applying a self-attention component to the sequence of text encodings to obtain a sequence of weighted text encodings. Some examples further include applying a second self-attention component to the sequence of video encodings to obtain a sequence of weighted video encodings. Some examples further include applying a cascaded cross-attention component to the sequence of weighted text encodings and the sequence of weighted video encodings to obtain the visual gate.

Some examples of the method, apparatus, non-transitory computer readable medium, and system further include applying a video-to-text cross-attention component to the sequence of weighted text encodings and the sequence of weighted video encodings to obtain a video-to-text cross-attention output. Some examples further include applying a text-to-text cross-attention component to the sequence of weighted text encodings and the video-to-text cross-attention output to obtain a text-to-text cross-attention output. Some examples further include applying a text-to-video cross-attention component to the sequence of weighted text encodings and the sequence of weighted video encodings to obtain a text-to-video cross-attention output, wherein the visual gate is based on the text-to-text cross-attention output and the text-to-video cross-attention output.

Some examples of the method, apparatus, non-transitory computer readable medium, and system further include generating a span annotation for each word of the transcript, wherein the intent labels include the span annotations. Some examples of the method, apparatus, non-transitory computer readable medium, and system further include identifying a first span of the transcript corresponding to a high-level intent category. Some examples further include identifying a second span of the transcript corresponding to a low-level intent category. In some aspects, the high-level intent category corresponds to a creative intent, the low-level intent category corresponds to a tool intent, and the video comprises a tutorial for a media editing application.

Some examples of the method, apparatus, non-transitory computer readable medium, and system further include displaying at least a portion of the transcript based on the intent label, wherein a span within the portion of the transcript includes visual markup indicating the intent label. Some examples of the method, apparatus, non-transitory computer readable medium, and system further include receiving a search query indicating an intent. Some examples further include comparing the search query to the intent label. Some examples further include retrieving the video based on the comparison. Some examples of the method, apparatus, non-transitory computer readable medium, and system further include generating a summary of the video based on the intent label.

The sequence labelling (i.e., labelling of intents) performed by embodiments described herein has several applications. For example, identifying the intents in a video allows for intent-based content search and recommendations, query-based intent snippet selection, and tutorial video intent highlighting and summarization.

To query for intents, a user may provide semantic information (i.e., a search query) to the system, and the system will then retrieve a span of intents within a defined time-window or associated with the parent creative intent. Further, recommended videos can show highlighted intents to allow a user to quickly preview important and creative tool intents, which allows them to avoid watching lengthy content, such as livestream videos that may be over two hours long. In some embodiments, the intent is time-coded by the transcript, which will allow the user to quickly jump to a point in the video where the intent is being discussed or demonstrated.

Figure 5:
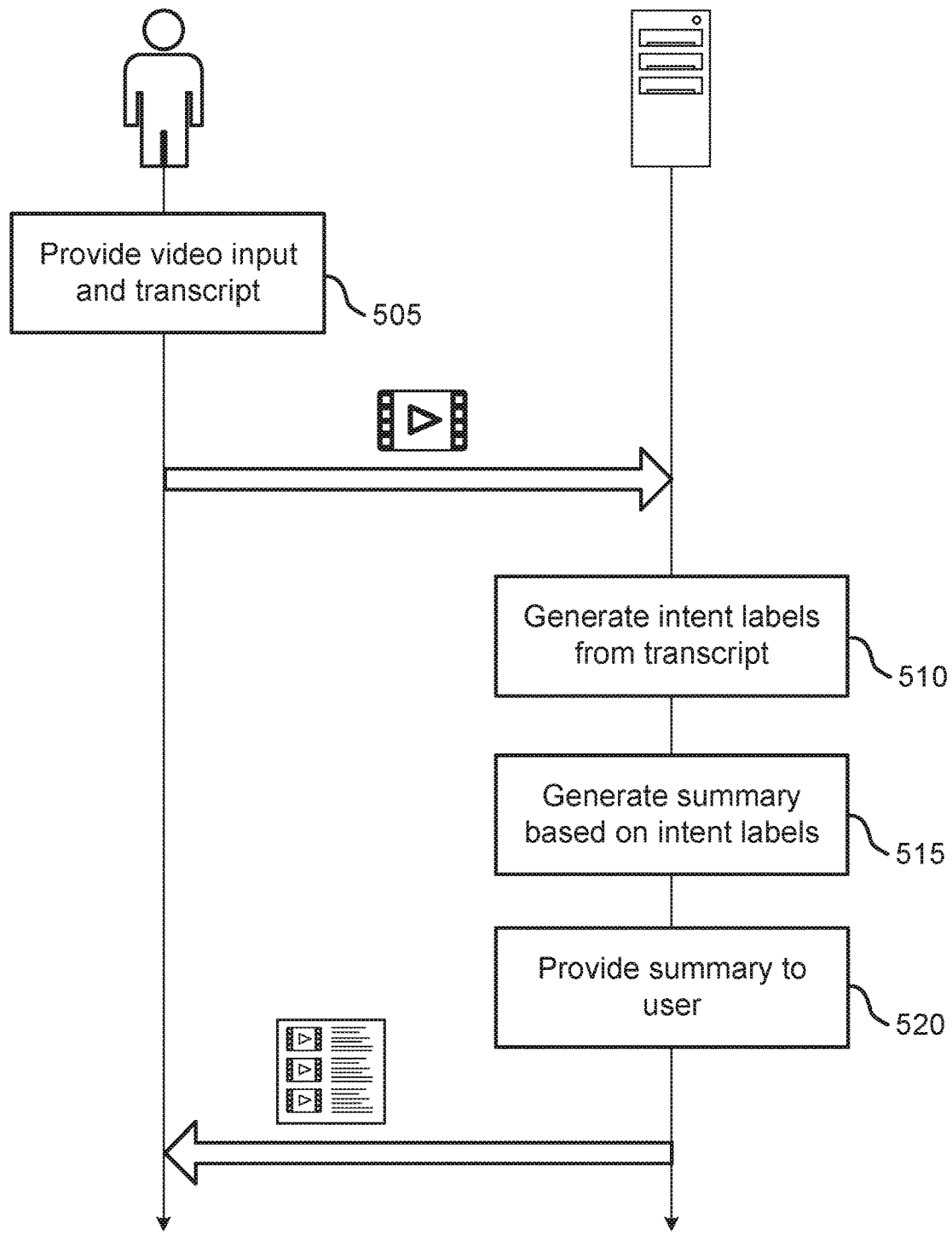
FIG. 5 shows an example of a method for video summarization according to aspects of the present disclosure.

FIG. 5 shows an example of a method 500 for video summarization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the user provides video input and transcript. For example, a user may select a video such as a prerecorded livestream to send to the system. In one example, the user selects the video for processing via a user interface, such as a browser based web application.

At operation 510, the system generates intent labels from transcript. In one example, the system extracts text features from the transcript, and candidate intents are generated based on the text features. The system may then apply a visual gate to the candidate intents to generate intent labels.

At operation 515, the system generates summary based on intent labels. In an example video summarization process, a summarization component of the intent discovery apparatus may select a set of representative intents from the video. Then, the summarization component selects frames corresponding to a time stamp of the intent. Then, the summarization component can arrange the frames with the intents as captions to form a summary, and provide the summary to a user. At operation 520, the system provides the summary to the user.

Figure 6:
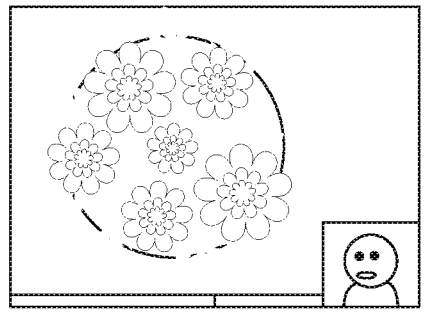
FIG. 6 shows an example of an example video with intents according to aspects of the present disclosure.
Figure 6:
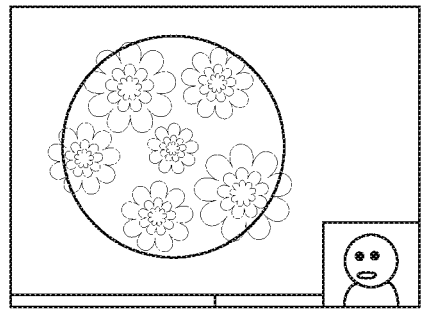
Figure 6:
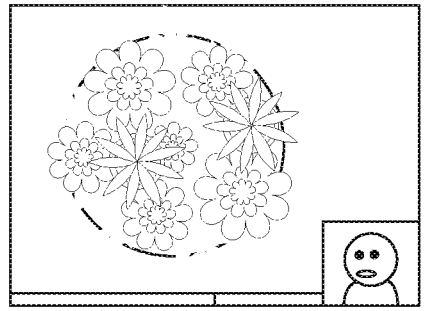
Figure 6:
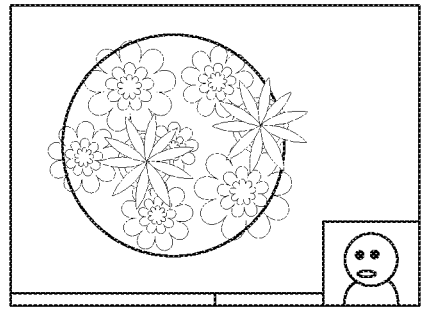

FIG. 6 shows an example of an example video with intents according to aspects of the present disclosure. The example shown includes high-level intent 600 and low-level intent 605.

In this example, high-level intent 600 corresponds to a creative intent. The creative intent can convey an abstract intent without an associated explicit tool or process. High-level intents 600 are indicated with bold text in FIG. 6.

In this example, low-level intent 605 corresponds to a tool intent. The tool intent indicates a software tool or mechanism that the user is currently using or will use. In some cases, low-level intent may indicate an intent to perform a specific step, such as to "make a new layer". Low-level intents 600 are indicated with underlined text in FIG. 6.

Figure 7:
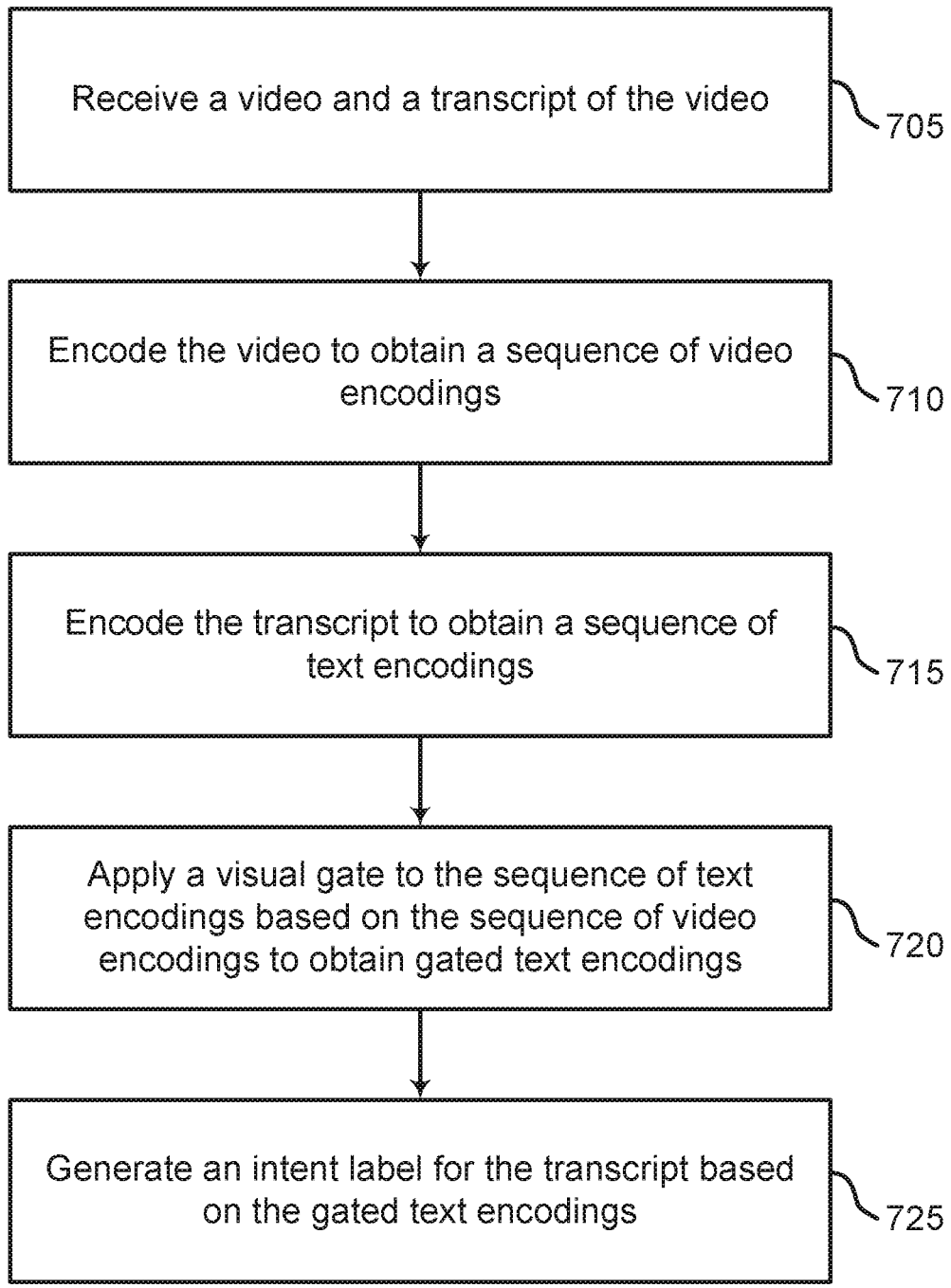
FIG. 7 shows an example of a method for generating an intent from a transcript according to aspects of the present disclosure.

FIG. 7 shows an example of a method 700 for generating an intent from a transcript according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives a video and a transcript of the video. In some cases, the operations of this step refer to, or may be performed by, an intent discovery apparatus as described with reference to FIGS. 1 and 2. In one example, the system is the intent discovery apparatus, and receives a video selected by the user. A transcribing component of the intent discovery apparatus may then generate a transcription from the audio within the selected video. In at least one embodiment, a transcribing component from another system different than the intent discovery apparatus may be used to transcribe the audio. In some examples, the transcript of the video is pre-generated and provided with the selected video.

At operation 710, the system encodes the video to obtain a sequence of video encodings. In some cases, the operations of this step refer to, or may be performed by, an image encoder as described with reference to FIGS. 2-4. As described with reference to FIG. 2, some embodiments of the image encoder include a CNN. The image encoder may generate a sequence of video encodings corresponding to frames of the video, spatial features within the video, motion features including information across multiple frames of the video, or a combination thereof.

At operation 715, the system encodes the transcript to obtain a sequence of text encodings. In some cases, the operations of this step refer to, or may be performed by, a text encoder as described with reference to FIGS. 2-4. As described with reference to FIG. 2, some embodiments of the text encoder include a transformer network, and some embodiments include a BERT network. In some examples, the text encoder divides the transcript into a set of sentences and divides each of the set of sentences into a sequence of tokens. Then, the text encoder encodes each token in the sequence of tokens to obtain the sequence of text encodings.

At operation 720, the system applies a visual gate to the sequence of text encodings based on the sequence of video encodings to obtain gated text encodings. In some cases, the operations of this step refer to, or may be performed by, a gating component as described with reference to FIGS. 2-4. As described with reference to FIG. 4, some examples of the visual gate are implemented by a gating component that includes a cascaded cross-attention component, as well as other components for applying concatenation, linear mapping, non-linear functions, or other operations to outputs of the cascaded cross-attention component and self-attention components.

At operation 725, the system generates an intent label for the transcript based on the gated text encodings. In some cases, the operations of this step refer to, or may be performed by, a classifier as described with reference to FIGS. 2-4. As described with reference to FIGS. 3 and 4, in some cases, the intent labels are generated by a classifier.

Figure 8:
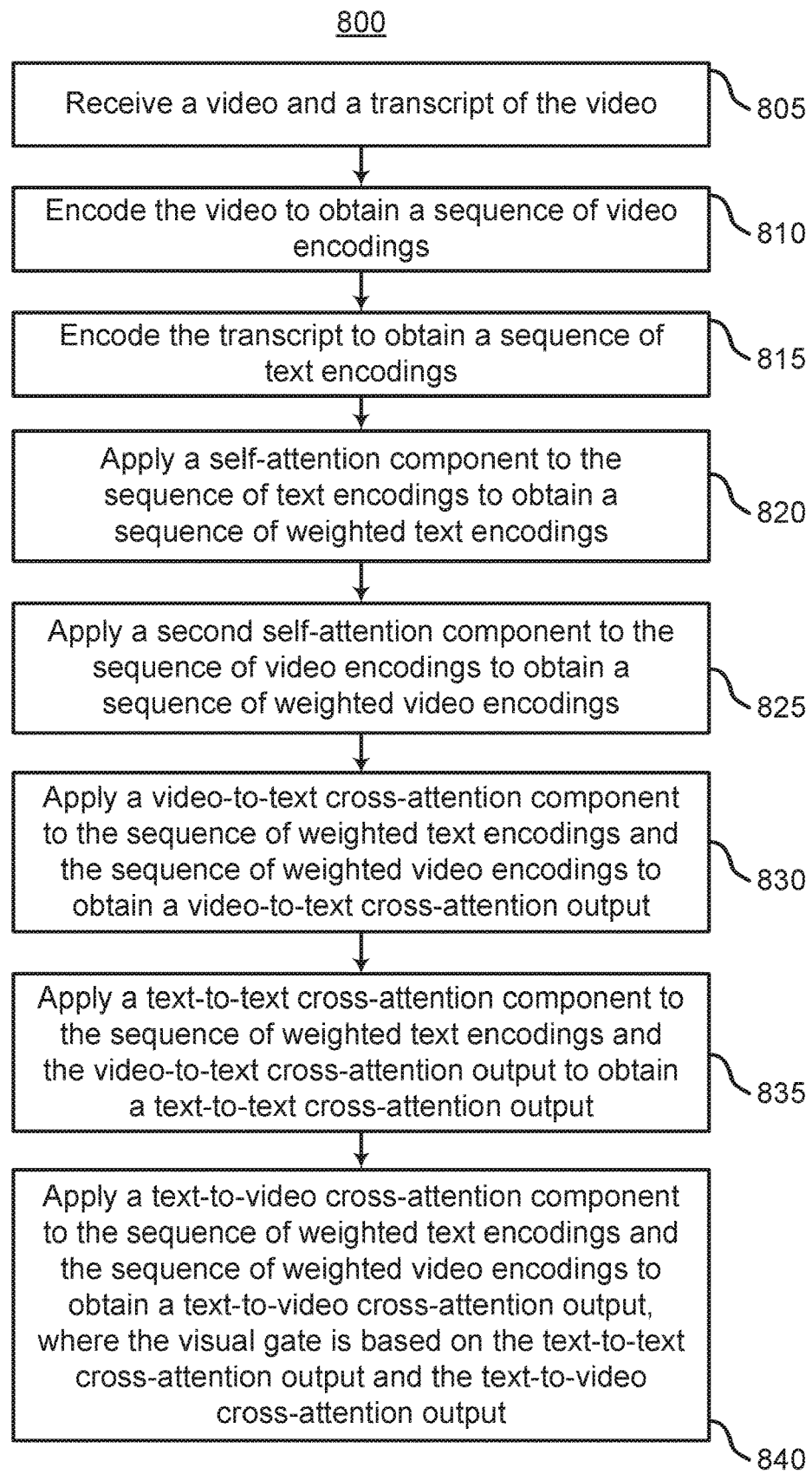
FIG. 8 shows an example of a method for gating text encodings according to aspects of the present disclosure.

FIG. 8 shows an example of a method 800 for gating text encodings according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a video and a transcript of the video. In some cases, the operations of this step refer to, or may be performed by, an intent discovery apparatus as described with reference to FIGS. 1 and 2. At operation 810, the system encodes the video to obtain a sequence of video encodings. In some cases, the operations of this step refer to, or may be performed by, an image encoder as described with reference to FIGS. 2-4. At operation 815, the system encodes the transcript to obtain a sequence of text encodings. In some cases, the operations of this step refer to, or may be performed by, a text encoder as described with reference to FIGS. 2-4.

At operation 820, the system applies a self-attention component to the sequence of text encodings to obtain a sequence of weighted text encodings. In some cases, the operations of this step refer to, or may be performed by, a gating component as described with reference to FIGS. 2 and 3.

At operation 825, the system applies a second self-attention component to the sequence of video encodings to obtain a sequence of weighted video encodings. In some cases, the operations of this step refer to, or may be performed by, a gating component as described with reference to FIGS. 2 and 3. Further detail components that may be used in operations 820 and 825 is provided with reference to FIG. 4.

At operation 830, the system applies a video-to-text cross-attention component to the sequence of weighted text encodings and the sequence of weighted video encodings to obtain a video-to-text cross-attention output. In some cases, the operations of this step refer to, or may be performed by, a gating component as described with reference to FIGS. 2 and 3, or a cascaded cross-attention component as described with reference to FIG. 4.

At operation 835, the system applies a text-to-text cross-attention component to the sequence of weighted text encodings and the video-to-text cross-attention output to obtain a text-to-text cross-attention output. In some cases, the operations of this step refer to, or may be performed by, a gating component as described with reference to FIGS. 2 and 3, or a cascaded cross-attention component as described with reference to FIG. 4.

At operation 840, the system applies a text-to-video cross-attention component to the sequence of weighted text encodings and the sequence of weighted video encodings to obtain a text-to-video cross-attention output, where the visual gate is based on the text-to-text cross-attention output and the text-to-video cross-attention output. In some cases, the operations of this step refer to, or may be performed by, a gating component as described with reference to FIGS. 2 and 3, or a cascaded cross-attention component as described with reference to FIG. 4.

Figure 9:
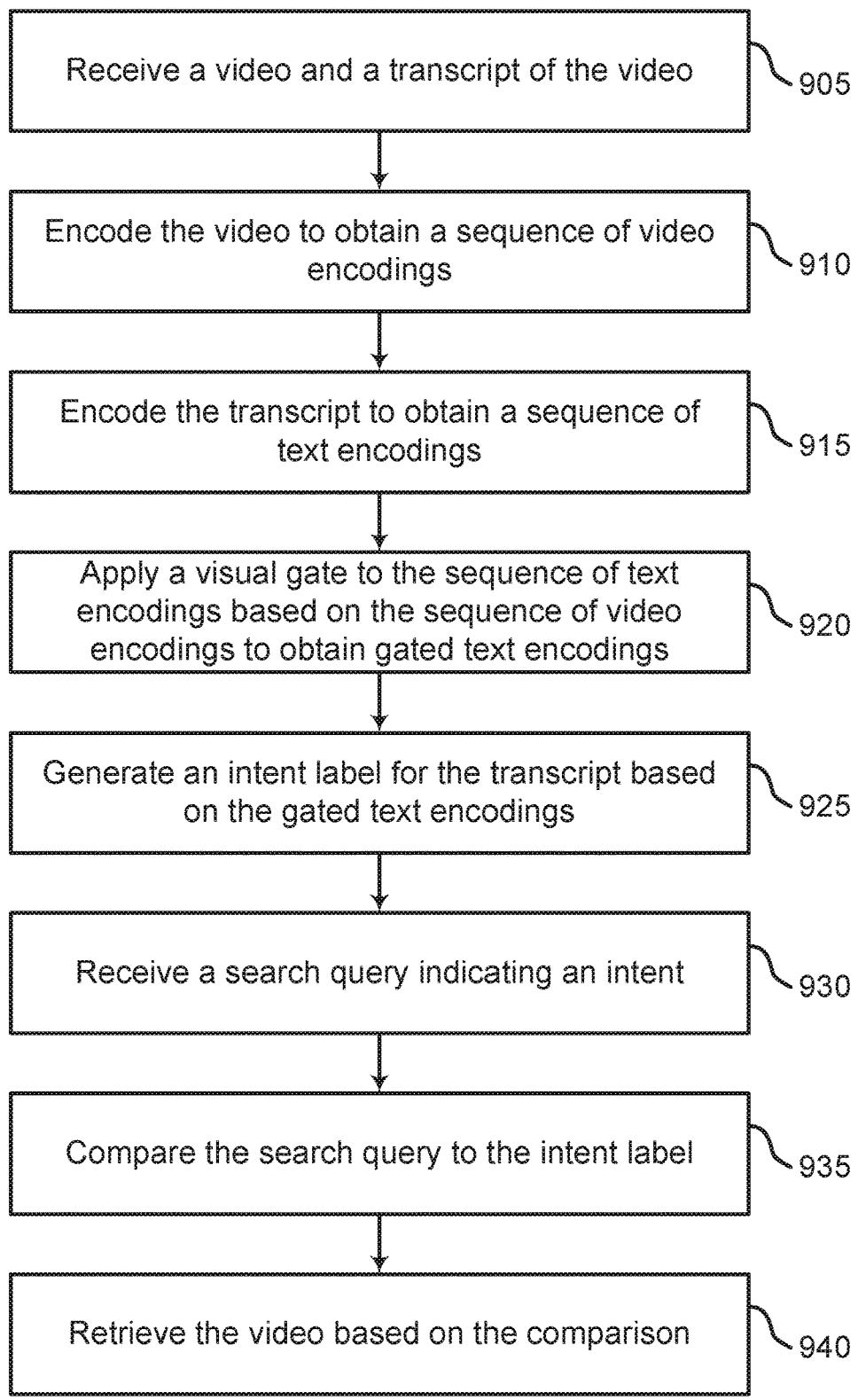
FIG. 9 shows an example of a method for finding videos according to aspects of the present disclosure.

FIG. 9 shows an example of a method 900 for finding videos according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives a video and a transcript of the video. In some cases, the operations of this step refer to, or may be performed by, an intent discovery apparatus as described with reference to FIGS. 1 and 2. At operation 910, the system encodes the video to obtain a sequence of video encodings. In some cases, the operations of this step refer to, or may be performed by, an image encoder as described with reference to FIGS. 2-4. At operation 915, the system encodes the transcript to obtain a sequence of text encodings. In some cases, the operations of this step refer to, or may be performed by, a text encoder as described with reference to FIGS. 2-4.

At operation 920, the system applies a visual gate to the sequence of text encodings based on the sequence of video encodings to obtain gated text encodings. In some cases, the operations of this step refer to, or may be performed by, a gating component as described with reference to FIGS. 2-4. At operation 925, the system generates an intent label for the transcript based on the gated text encodings. In some cases, the operations of this step refer to, or may be performed by, a classifier as described with reference to FIGS. 2-4.

At operation 930, the system receives a search query indicating an intent. In some cases, the operations of this step refer to, or may be performed by, a search component as described with reference to FIG. 2. At operation 935, the system compares the search query to the intent label. In some cases, the operations of this step refer to, or may be performed by, a search component as described with reference to FIG. 2. At operation 940, the system retrieves the video based on the comparison. In some cases, the operations of this step refer to, or may be performed by, a search component as described with reference to FIG. 2.

Training

A method for multimodal intent discovery is described. One or more aspects of the method include receiving training data including a video, a transcript of the video, and a ground-truth intent label; encoding the video to obtain a sequence of video encodings; encoding the transcript to obtain a sequence of text encodings; applying a visual gate of a machine learning model to the sequence of text encodings based on the sequence of video encodings to obtain gated text encodings; predicting an intent label for the transcript based on the gated text encodings using the machine learning model; and updating parameters of the machine learning model based on the predicted intent label and the ground-truth intent label.

Some examples of the method, apparatus, non-transitory computer readable medium, and system further include computing a cross-entropy loss based on the predicted intent label and the ground-truth intent label, wherein the parameters of the machine learning model are updated based on the cross-entropy loss. At least one embodiment of the model is trained end-to-end using cross-entropy loss, which can be described by the loss function as shown:

$$\mathcal{L}_\theta = -\frac{1}{N}\sum_{i=1}^{N} z_i \log(\hat{z}_i) \tag{5}$$

where θ represents parameters of the entire model.

Figure 10:
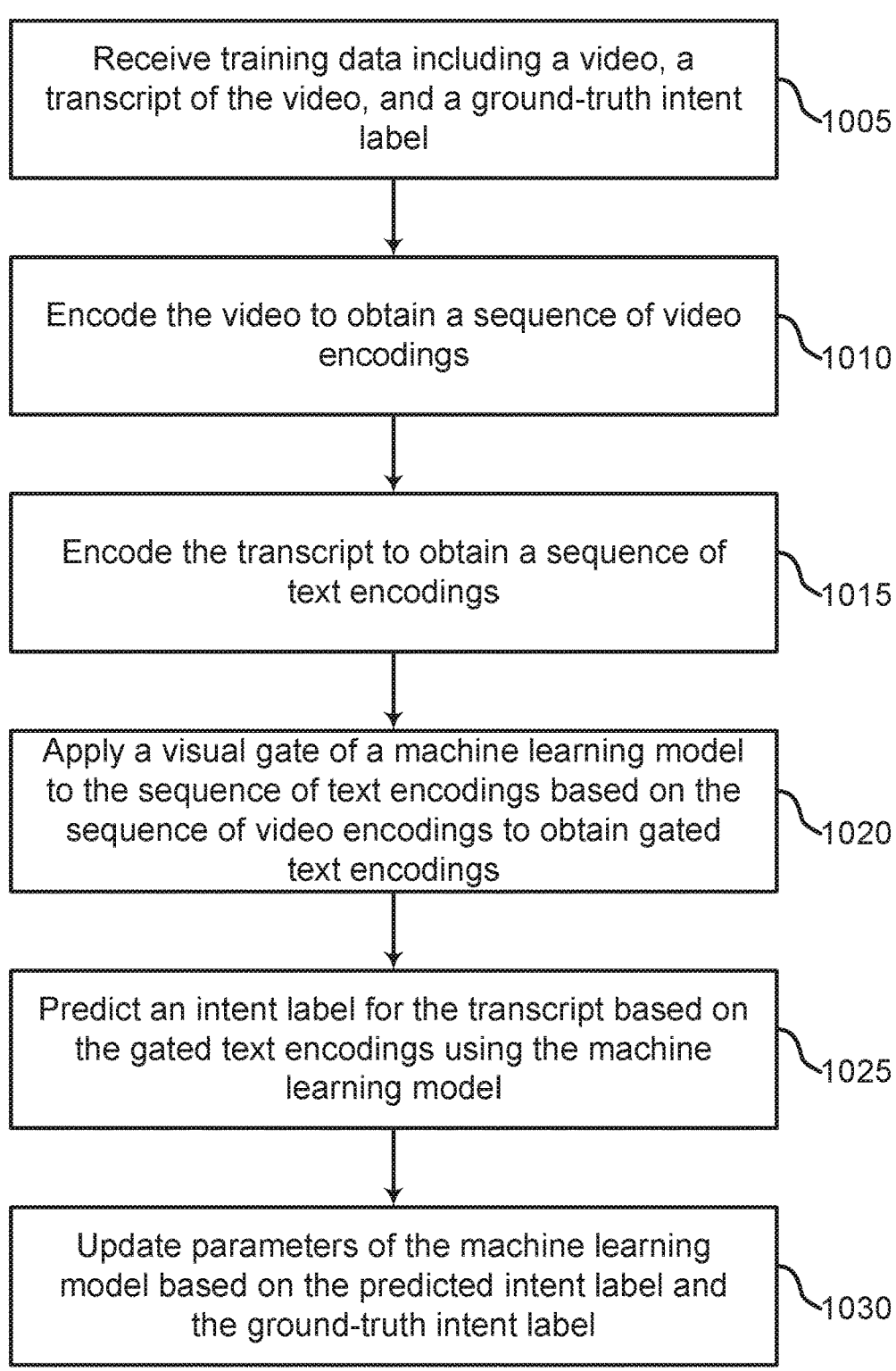
FIG. 10 shows an example of a method for training an intent discovery apparatus according to aspects of the present disclosure.

FIG. 10 shows an example of a method 1000 for training an intent discovery apparatus according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system receives training data including a video, a transcript of the video, and a ground-truth intent label. In some cases, the operations of this step refer to, or may be performed by, a training component as described with reference to FIG. 2. In one example, the system is the intent discovery apparatus, and receives a video selected by the user. A transcribing component of the intent discovery apparatus may then generate a transcription from the audio within the selected video. In at least one embodiment, a transcribing component may be from another system which is different than the intent discovery apparatus that is used to transcribe audio. In some examples, the transcript of the video may be pre-generated similar to the ground-truth intent label and provided with the selected video. In some embodiments, the video, transcript of the video, and ground-truth intent label are provided by an individual other than the user during a training phase in order to train the system before it is used for the intent discovery apparatus.

At operation 1010, the system encodes the video to obtain a sequence of video encodings. In some cases, the operations of this step refer to, or may be performed by, an image encoder as described with reference to FIGS. 2-4. As described with reference to FIG. 2, some embodiments of the image encoder include a CNN. The image encoder may generate a sequence of video encodings corresponding to frames of the video, spatial features within the video, motion features including information across multiple frames of the video, or a combination thereof.

At operation 1015, the system encodes the transcript to obtain a sequence of text encodings. In some cases, the operations of this step refer to, or may be performed by, a text encoder as described with reference to FIGS. 2-4. As described with reference to FIG. 2, some embodiments of the text encoder include a transformer network, and some embodiments include a BERT network. In some examples, the text encoder divides the transcript into a set of sentences and divides each of the set of sentences into a sequence of tokens. Then, the text encoder encodes each token in the sequence of tokens to obtain the sequence of text encodings.

At operation 1020, the system applies a visual gate of a machine learning model to the sequence of text encodings based on the sequence of video encodings to obtain gated text encodings. In some cases, the operations of this step refer to, or may be performed by, a gating component as described with reference to FIGS. 2-4. As described with reference to FIG. 4, some examples of the visual gate are implemented by a gating component that includes a cascaded cross-attention component, as well as other components for applying concatenation, linear mapping, non-linear functions, or other operations to outputs of the cascaded cross-attention component and self-attention components.

At operation 1025, the system predicts an intent label for the transcript based on the gated text encodings using the machine learning model. In some cases, the operations of this step refer to, or may be performed by, a classifier as described with reference to FIGS. 2-4. At operation 1030, the system updates parameters of the machine learning model based on the predicted intent label and the ground-truth intent label. In some embodiments, the parameters are updated based on the cross-entropy loss described above. In some cases, the operations of this step refer to, or may be performed by, a training component as described with reference to FIG. 2.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:
1. A method for identifying intents, comprising:
receiving a video and a transcript of the video;
encoding the video to obtain a sequence of video encodings;

encoding the transcript to obtain a sequence of text encodings;
applying a visual gate to the sequence of text encodings by performing a cross-attention mechanism on the sequence of text encodings and the sequence of video encodings to obtain gated text encodings; and
generating an intent label for the transcript based on the gated text encodings.

2. The method of claim 1, further comprising:
selecting a plurality of frames of the video; and
encoding each of the plurality of frames using an image encoder to obtain the sequence of video encodings.

3. The method of claim 1, further comprising:
identifying audio data associated with the video; and
performing a text-to-speech conversion on the audio data to obtain the transcript.

4. The method of claim 1, further comprising:
dividing the transcript into a plurality of sentences;
dividing each of the plurality of sentences into a sequence of tokens; and
encoding each token in the sequence of tokens to obtain the sequence of text encodings.

5. The method of claim 1, further comprising:
combining the sequence of video encodings with the sequence of text encodings to obtain a sequence of combined encodings; and
applying a temporal transformer to the sequence of combined encodings to obtain the visual gate.

6. The method of claim 1, further comprising:
applying a self-attention component to the sequence of text encodings to obtain a sequence of weighted text encodings, wherein the visual gate is applied to the sequence of weighted text encodings.

7. The method of claim 1, further comprising:
applying a self-attention component to the sequence of text encodings to obtain a sequence of weighted text encodings;
applying a second self-attention component to the sequence of video encodings to obtain a sequence of weighted video encodings; and
applying a cascaded cross-attention component to the sequence of weighted text encodings and the sequence of weighted video encodings to obtain the visual gate.

8. The method of claim 7, further comprising:
applying a video-to-text cross-attention component to the sequence of weighted text encodings and the sequence of weighted video encodings to obtain a video-to-text cross-attention output;
applying a text-to-text cross-attention component to the sequence of weighted text encodings and the video-to-text cross-attention output to obtain a text-to-text cross-attention output; and
applying a text-to-video cross-attention component to the sequence of weighted text encodings and the sequence of weighted video encodings to obtain a text-to-video cross-attention output, wherein the visual gate is based on the text-to-text cross-attention output and the text-to-video cross-attention output.

9. The method of claim 1, further comprising:
generating a span annotation for each word of the transcript, wherein the intent labels include the span annotations.

10. The method of claim 1, further comprising:
identifying a first span of the transcript corresponding to a high-level intent category; and
identifying a second span of the transcript corresponding to a low-level intent category.

11. The method of claim 10, wherein:
the high-level intent category corresponds to a creative intent, the low-level intent category corresponds to a tool intent, and the video comprises a tutorial for a media editing application.

12. The method of claim 1, further comprising:
displaying at least a portion of the transcript based on the intent label, wherein a span within the portion of the transcript includes visual markup indicating the intent label.

13. The method of claim 1, further comprising:
receiving a search query indicating an intent;
comparing the search query to the intent label; and
retrieving the video based on the comparison.

14. The method of claim 1, further comprising:
generating a summary of the video based on the intent label.

15. A method for predicting intents, comprising:
receiving training data including a video, a transcript of the video, and a ground-truth intent label;
encoding the video to obtain a sequence of video encodings;
encoding the transcript to obtain a sequence of text encodings;
applying a visual gate of a machine learning model to the sequence of text encodings based on the sequence of video encodings to obtain gated text encodings;
predicting an intent label for the transcript based on the gated text encodings using the machine learning model; and
updating parameters of the machine learning model based on the predicted intent label and the ground-truth intent label.

16. The method of claim 15, further comprising:
computing a cross-entropy loss based on the predicted intent label and the ground-truth intent label, wherein the parameters of the machine learning model are updated based on the cross-entropy loss.

17. An apparatus for identifying intents, comprising:
an image encoder configured to encode a video to obtain a sequence of video encodings;
a text encoder configured to encode a transcript of the video to obtain a sequence of text encodings;
a gating component configured to apply a visual gate to the sequence of text encodings by performing a cross-attention mechanism on the sequence of text encodings and based on the sequence of video encodings to obtain gated text encodings; and
a classifier configured to generate an intent label for the transcript based on the gated text encodings.

18. The apparatus of claim 17, wherein:
the gating component comprises a temporal transformer.

19. The apparatus of claim 17, wherein:
the gating component comprises a text self-attention component, a video self-attention component, and a cascaded cross-attention component.

20. The apparatus of claim 19, wherein:
the cascaded cross-attention component comprises a video-to-text cross-attention component, a text-to-text cross-attention component, and a text-to-video cross-attention component.

* * * * *